United States Patent
Hageman et al.

(10) Patent No.: US 6,305,758 B1
(45) Date of Patent: Oct. 23, 2001

(54) ELECTRO-HYDRAULIC ACTUATOR FOR MOTOR VEHICLE BRAKE

(75) Inventors: John Benjamin Hageman; Donald Edward Schenk, both of Vandalia; Schuyler Scott Shaw, Dayton, all of OH (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/270,560

(22) Filed: Mar. 16, 1999

(51) Int. Cl.[7] .................................................. B60T 8/42
(52) U.S. Cl. .................... 303/115.2; 303/113.4; 303/155
(58) Field of Search ............... 303/115.2, 113.4, 303/13.15, 20, 155

(56) References Cited

U.S. PATENT DOCUMENTS

| | | | |
|---|---|---|---|
| 5,042,885 | * | 8/1991 | Villec .................................. 303/115.2 |
| 5,147,117 | * | 9/1992 | Quinn .................................. 303/115.2 |
| 5,163,744 | * | 11/1992 | Tiernay et al. ...................... 303/115.2 |
| 5,927,825 | * | 7/1999 | Schenk et al. ...................... 303/115.2 |
| 6,105,737 | * | 8/2000 | Weigert et al. ...................... 188/158 |

* cited by examiner

Primary Examiner—Matthew C. Graham
(74) Attorney, Agent, or Firm—Robert M. Sigler

(57) ABSTRACT

An electro-hydraulic actuator for a motor vehicle brake-by-wire brake system including a housing, a piston bore in the housing, a T-shaped piston in the piston bore, and an electric motor connected to the piston through a speed reducer. The T-shaped piston includes a disc-shaped head in the piston bore and a tubular stem perpendicular slidable in and out of the piston bore through a sealed guide in the bottom of the piston bore. The top side of the piston head opposite the stem constitutes a large effective area of the piston for rapidly expelling a relatively large volume of fluid from the piston bore in a low pressure interval of operation the actuator. When the fluid pressure in the piston bore exceeds a transition pressure, a transition valve opens a bypass passage to the piston bore behind the piston head so that the same fluid pressure reacts against the bottom side of the piston head around the stem. A high pressure interval of operation of the electro-hydraulic actuator then ensues in which the effective area of the piston is reduced to the area of the cross-sectional profile of the stem.

5 Claims, 3 Drawing Sheets

ELECTRO-HYDRAULIC ACTUATOR FOR MOTOR VEHICLE BRAKE

TECHNICAL FIELD

This invention relates to an electro-hydraulic actuator for a motor vehicle brake-by-wire brake system.

BACKGROUND OF THE INVENTION

A traditional motor vehicle brake system includes a plurality of fluid pressure actuated wheel brakes, a master cylinder, and a brake pedal linked to a piston assembly in the master cylinder. To apply the wheel brakes, an operator pushes on the brake pedal and linearly strokes the piston assembly to create a high fluid pressure in the wheel brakes through a plurality of hydraulic channels. Before the wheel brakes become applied, fluid expelled by the piston assembly must first take up compliance in the wheel brakes and in the hydraulic channels. To maximize response, the piston assembly typically has a relatively large effective area in order to rapidly expel a substantial volume of fluid at relatively low fluid pressure at the onset of pedal travel. To attain high fluid pressure to apply the wheel brakes without requiring that the operator apply an uncomfortably high pedal force, the traditional motor vehicle brake system also typically includes a booster which supplements the pedal force applied by the operator.

A brake-by-wire brake system is distinguished from traditional motor vehicle brake systems by the addition of an electro-hydraulic actuator having a piston which performs the function of the master cylinder piston assembly but which is driven through a speed reducer by an electric motor under the control of an electronic control module (ECM) on the motor vehicle. The electrohydraulic actuator piston has a relatively large effective area for rapid response. However, to attain high fluid pressure for wheel brake application with a piston having a large effective area, the electric motor must have a relatively high torque capacity. Such high capacity electric motors are relatively expensive and represent a significant fraction of the cost of a brake-by-wire brake system. An electro-hydraulic actuator according to this invention for a brake-by-wire brake system is an improvement over prior electro-hydraulic actuators having comparable performance characteristics in that the electro-hydraulic actuator according to this invention includes a more economical electric motor of reduced torque capacity.

SUMMARY OF THE INVENTION

This invention is a new and improved electro-hydraulic actuator for a motor vehicle brake-by-wire brake system including a housing, a piston bore in the housing, a T-shaped piston in the piston bore, and an electric motor connected to the piston through a speed reducer. The T-shaped piston includes a disc-shaped head supported in the piston bore for back and forth linear translation and a tubular stem perpendicular to the head slidable in and out of the piston bore through a sealed guide in the bottom of the piston bore. The side of the piston head opposite the stem, referred to herein as the "top side", constitutes a large effective area of the piston for rapidly expelling a relatively large volume of fluid from the piston bore in a low pressure interval of operation the actuator. When the fluid pressure in the piston bore exceeds a transition pressure, a transition valve opens a bypass passage to the piston bore behind the piston head so that the same fluid pressure reacts against the other side of the piston head, referred to herein as the "bottom side". A high pressure interval of operation of the electro-hydraulic actuator then ensues in which the effective area of the piston is reduced to the area of the cross-sectional profile of the stem so that high fluid pressure is produced in the piston bore with less output torque from the electric motor.

DESCRIPTION OF THE PREFERRED EMBODIMENT

Figure 1:
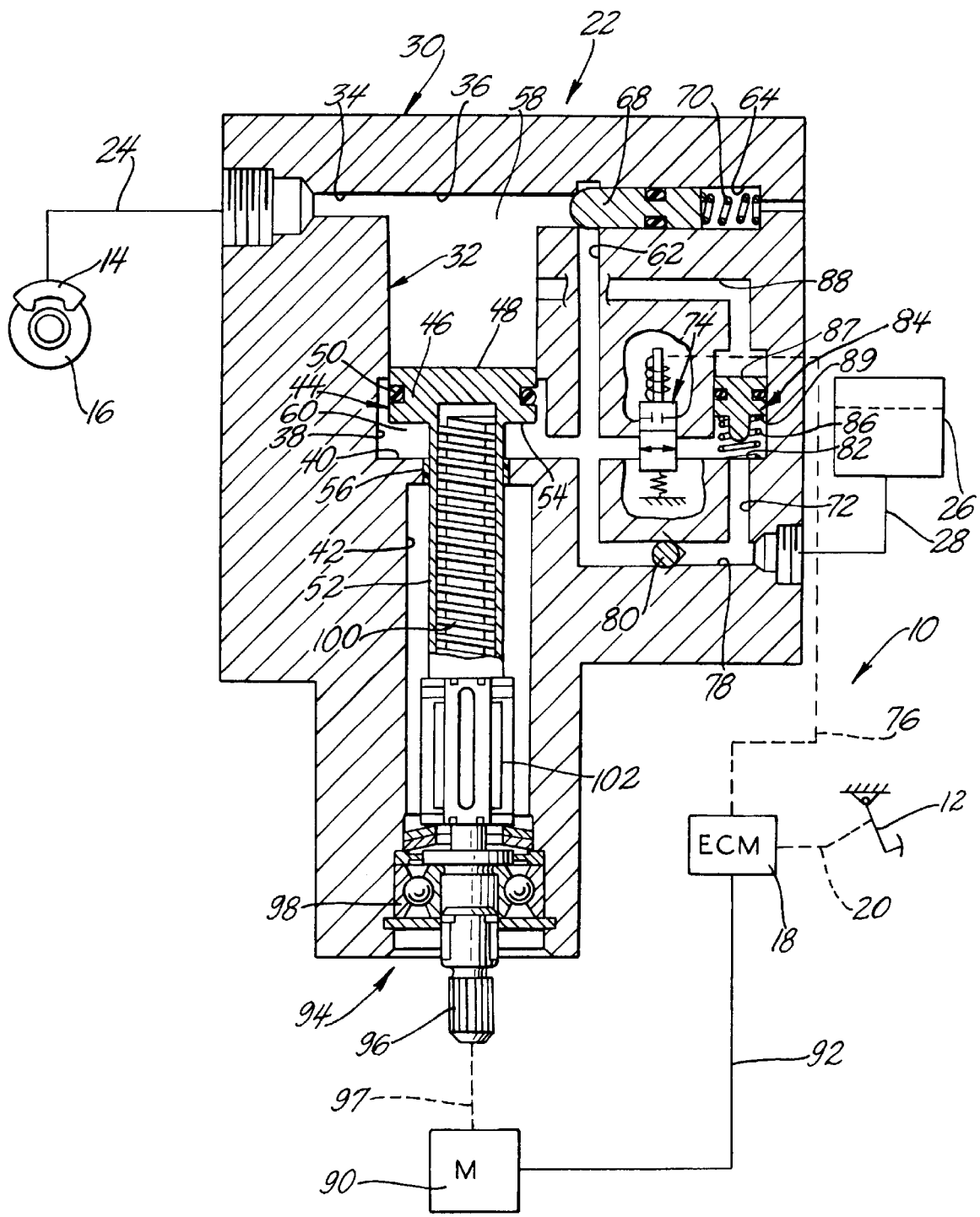
FIG. 1 is a schematic, partially broken-away view of a motor vehicle brake-by-wire brake system including an electro-hydraulic actuator according to this invention.
Figure 2:
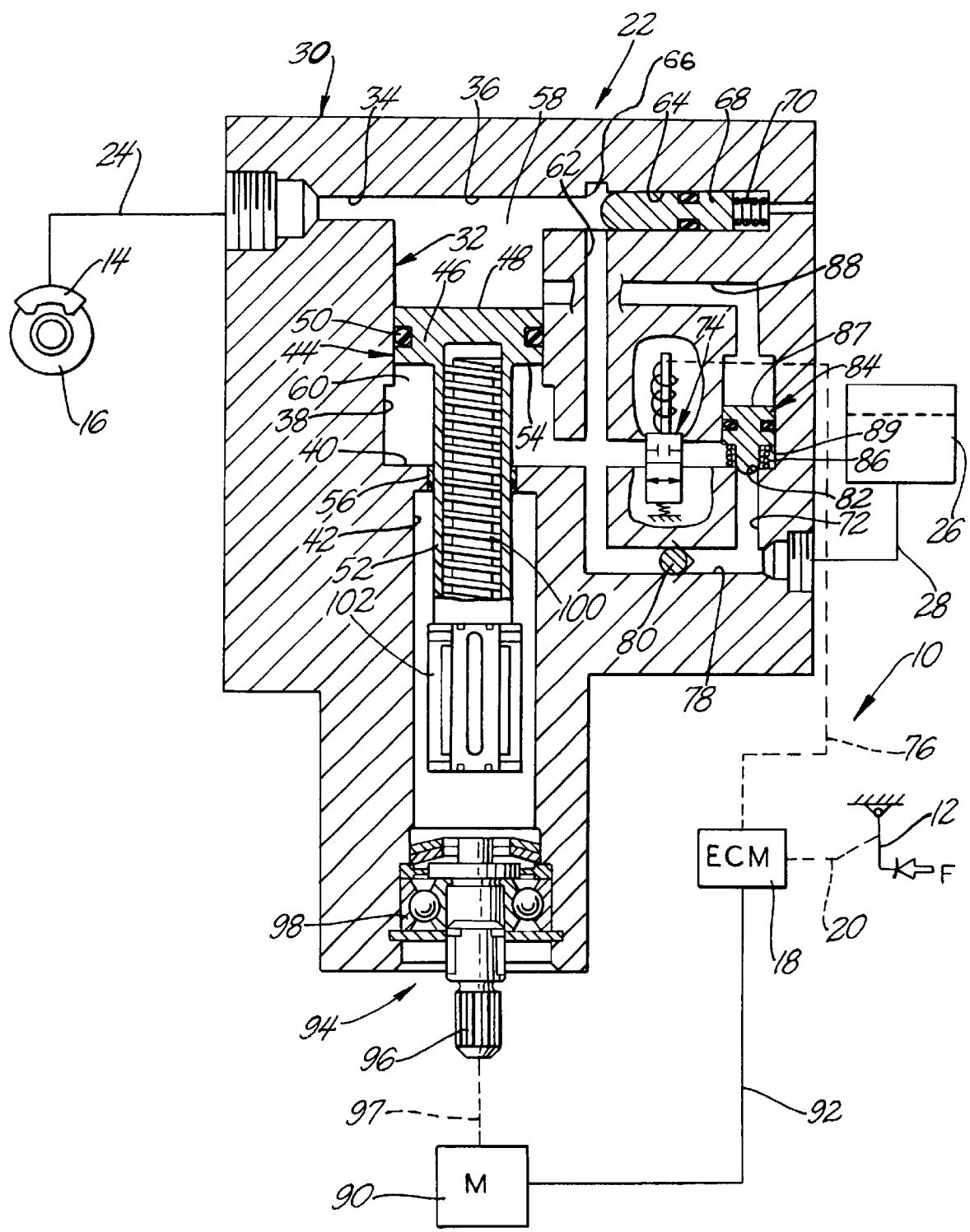
FIG. 2 is similar to FIG. 1 but illustrating structural elements of the electro-hydraulic actuator according to this invention in different relative positions.

Referring to FIGS. 1–2, a schematically represented brake-by-wire brake system 10 for a motor vehicle, not shown, includes a brake pedal 12 and a fluid pressure actuated wheel brake 14 around a brake rotor 16 attached to a road wheel, not shown, of the motor vehicle. An ECM 18 on the motor vehicle is electronically connected to a force/position transducer, not shown, on the brake pedal through a schematically represented conductor 20. An electro-hydraulic actuator 22 according to this invention is connected to the wheel brake 14 through a hydraulic channel 24 and to a fluid reservoir 26 at atmospheric pressure through a fluid conduit 28.

The electro-hydraulic actuator 22 includes a schematically represented housing 30 supported on a body, not shown, of the motor vehicle. The housing 30 has a piston bore 32 therein connected to the hydraulic channel 24 through a passage 34 in the housing at a schematically represented top end 36 of the piston bore. The piston bore is interrupted by an annular groove 38 adjacent a bottom end 40 of the piston bore defined by a web on the housing which separates the piston bore from a speed reducer bore 42.

A T-shaped piston 44 of the electro-hydraulic actuator 22 includes a disc-shaped head 46 supported in the piston bore 32 for linear translation with a top side 48 of the piston head facing the top end 36 of the piston bore and with a seal 50 on the piston head sealing against the piston bore. The piston 44 further includes a tubular stem 52 perpendicular to a bottom side 54 of the piston head facing the bottom end 40 of the piston bore. The tubular stem slides in and out of the piston bore 32 and in and out of the speed reducer bore 42 through a guide 56 in the bottom end of the piston bore which also seals against the stem.

The piston head 46 divides the piston bore 32 into a cylindrical primary chamber 58 between the top end 36 of the piston bore and the top side 48 of the piston head and an annular secondary chamber 60 around the stem 52 between the bottom end 40 of the piston bore and the bottom side 54 of the piston head. The primary chamber 58 communicates with the hydraulic channel 24 through the passage 34 and with the secondary chamber 60 through a bypass passage 62 in the housing 30. A transition valve bore 64 in the housing intersects the bypass passage and defines a valve seat 66, FIG. 2, around the bypass passage. A transition valve element 68 is supported in the transition valve bore for back and forth linear translation and is biased by a spring 70 to a closed position, FIG. 1, seated on the valve seat 66 and blocking the bypass passage 62.

An exhaust passage 72 in the housing 30 intersects the bypass passage 62 between the valve seat 66 and the secondary chamber 60 and is connected to the fluid reservoir 26 through the fluid conduit 28. The exhaust passage is interrupted by a solenoid operated exhaust valve 74 electronically controlled by the ECM 18 through a schematically represented conductor 76. When the solenoid is off, FIG. 1, the exhaust valve is open and the exhaust passage is unblocked. When the solenoid is on, FIG. 2, the exhaust valve is closed and the exhaust passage is blocked. A fill passage 78 in the housing 30 parallel to the exhaust passage 72 is interrupted by a check valve 80 which blocks fluid flow from the secondary chamber to the reservoir without interfering with fluid flow in the opposite direction.

The exhaust passage 72 is also interrupted by a valve seat 82, FIG. 1, downstream of the exhaust valve 74 facing a compensation valve element 84 supported on the housing 30 for linear translation between an open position, FIG. 1, remote from the valve seat 82 and a closed position, FIG. 2, seated on the valve seat 82 and blocking the exhaust passage. A spring 86 biases the compensation valve element toward its open position. Fluid at the pressure prevailing in the primary chamber 58 of the piston bore reacts on a top surface 87 of the compensation valve element 84 through a passage 88 in the housing 30 and urges the compensation valve element toward its closed position. In the closed position of the compensation valve element, an annular bottom surface 89 thereof smaller in area than the top surface 87 is exposed to fluid pressure in the exhaust passage 72 downstream of the exhaust valve 74.

The electro-hydraulic actuator 22 further includes a reversible electric motor 90 turned on and off by the ECM 18 through a schematically represented conductor 92 and a speed reducer 94. The speed reducer 94 includes a drive shaft 96 rotatably supported on the housing 30 by an anti-friction thrust bearing 98 and connected to an output shaft 97 of the electric motor 90 for rotation as a unit therewith. A screw-threaded end 100 of the drive shaft 96 overlaps the piston 44 inside of the tubular stem 52 thereof. A low friction nut 102 rigidly attached to the stem of the piston around the drive shaft 96 cooperates with the screw-threaded end 100 thereof in converting output torque of the electric motor 90 into linear thrust on the piston 44.

The electro-hydraulic actuator 22 operates as now described. With the force/position transducer on the brake pedal 12 electronically signaling to the ECM 18 the absence of a brake apply force on the brake pedal, the piston 44 is in a retracted position thereof, FIG. 1, in which the annular groove 38 in the piston bore overlaps the seal 50 on the piston head to relieve the seal separating the primary and secondary chambers 58,60. At the same time, the electric motor 90 and the solenoid operated exhaust valve 74 are off and the spring 86 biases the compensation valve element 84 to its open position so that the secondary chamber 60 is exposed to the reservoir 26 through the exhaust passage 72 and the fluid conduit 28. Also, the spring 70 biases the transition valve element 68 to its closed position, FIG. 1, blocking the bypass passage 62. In this circumstance, the primary and secondary chambers 58,60, the hydraulic channel 24, and the wheel brake 14 are all filled with fluid at atmospheric pressure and the rotor 16 is released from the wheel brake.

To stop or slow the motor vehicle, an operator exerts on the brake pedal 12 a brake apply force represented by a schematic force vector "F", FIG. 2. The force/position transducer on the brake pedal electronically signals the ECM 18 to turn on the electric motor 90 in a brake apply direction of rotation of the output shaft 97 thereof. The speed reducer 94 converts output torque of the electric motor in the brake apply direction of rotation of the output shaft 97 into thrust on the piston 44 which induces linear translation thereof toward the top end 36 of the piston bore. At the same time, fluid pressure reacting against the top surface 87 of the compensation valve element 84 translates the compensation valve element to its closed position while fluid from the reservoir 26 replenishes the expanding secondary chamber 60 through the fill passage 78.

At the onset of linear translation of the piston toward the top end of the piston bore, the overlap between the annular groove 38 and the seal 50 is eliminated so that separation between the primary and secondary chambers 58,60 across the piston head 46 is restored. With the transition valve element 68 initially in its closed position, the effective area of the piston 44 is constituted by the area of the top side 48 of the piston head. The area of the top side of the piston head is relatively large and calculated to expel enough fluid from the primary chamber to rapidly take up compliance in the hydraulic channel 24 and in the wheel brake 14 in a short, low pressure interval of operation of the electro-hydraulic actuator.

A high pressure interval of operation of the electro-hydraulic actuator then ensues which is characterized by a rapid increase in the pressure of fluid trapped in the primary chamber 58, the hydraulic channel 24, and the wheel brake 14 to squeeze the wheel brake progressively harder against the rotor 16 as the electric motor thrusts the piston 44 against the trapped fluid. At the onset of the high pressure interval of operation, the transition valve element 68 and the compensation valve element 84 are in their closed positions and the solenoid operated exhaust valve 74 is open. When the fluid pressure in the primary chamber 58 attains a transition pressure, the transition valve element 68 is thrust to an open position, FIG. 2, off of the valve seat 66 to open the bypass passage 62. Fluid pressure prevailing in the primary chamber 58 is then communicated to and likewise prevails in the secondary chamber 60. With the bypass passage 62 open, the same fluid pressure reacts against both the top and the bottom surfaces 87,89 of the compensation valve element 84. However, because the top surface 87 is larger in area than the annular bottom surface 89, the net fluid pressure force on the compensation valve element is toward the valve seat 82 so that the compensation valve element remains in its closed position blocking the exhaust passage 72.

Importantly, the result of the same fluid pressure reacting at the same time against both sides 48,54 of the piston head is that the effective area of the piston 44 is reduced by the cross-sectional area of the annular secondary chamber 58. That is, the effective area of the piston 44 is reduced to the area of the cross-sectional profile of the stem 52. With the effective area of the piston thus reduced, less linear thrust on the piston is required to produce high fluid pressure for applying the wheel brake 14 than would be otherwise be required if the effective area of the piston remained equal to the area of the top side 48 of the piston head. Accordingly, because less output torque is required from the electric motor 90, the torque rating and cost thereof can be reduced without compromising the performance of the electro-hydraulic actuator 22.

To release the rotor 16 from the wheel brake 14, the apply the force F on the brake pedal 12 is released. In response to the corresponding electronic signal from the force/position transducer on the brake pedal, the ECM 18 turns on the electric motor 90 in a brake release direction of rotation of the output shaft 97 thereof to backdrive the piston 44 toward its retracted position. Fluid pressure in the primary chamber decreases as the primary chamber expands and fluid recirculates from the collapsing secondary chamber to the primary chamber through the open bypass passage 62. When the fluid pressure in the primary chamber is reduced to the transition pressure, the transition valve element 68 is thrust by the spring 70 to its closed position blocking the bypass passage. Then, fluid trapped in the secondary chamber 60 reacts against the bottom surface 89 of the compensation valve element 84 and, with the spring 86, thrusts the compensation valve element to its open position to open the exhaust passage 72 and exhaust the secondary chamber to the fluid reservoir as the electric motor backdrives the piston to its retracted position, FIG. 1.

For energy conservation and maximum durability, the ECM 18 turns on the solenoid operated exhaust valve 74 to block the exhaust passage 72 upstream of the valve seat 82 and turns off the electric motor 90 when the pedal force F is sustained for a predetermined duration after the motor vehicle is stopped. In that circumstance, a net pressure force on the piston head 46 backdrives the piston toward the bottom end of the piston bore while also backdriving the electric motor through the speed reducer. As the stem 52 of the piston slides through the guide 56, the fluid pressure in the primary and secondary chambers 58,60, in the hydraulic channel 24, and in the wheel brake 14 decreases until, at the transition pressure, the transition valve element 68 is thrust to its closed position blocking the bypass passage 62. With the bypass passage blocked and the exhaust passage blocked by the closed solenoid operated exhaust valve 74, a fluid lock is created which immobilizes the piston in the piston bore. The fluid pressure then prevailing in the primary chamber is slightly below the transition pressure but still of sufficient magnitude that the wheel brake continues to prevent rotation of the rotor 16.

To release the rotor from the wheel brake, the sustained apply force F on the brake pedal 12 is released. In response to the corresponding electronic signal from the force/position transducer on the brake pedal, the ECM turns off the solenoid operated exhaust valve 74 to open the exhaust passage upstream of the valve seat 82 and turns on the electric motor 90 in the brake release direction of rotation of the output shaft 97 thereof. Fluid pressure in the secondary chamber reacts against the compensation valve element 84 and, with the spring 86, thrusts the compensation valve element to its open position to exhaust the secondary chamber to the fluid reservoir as the electric motor backdrives the piston to its retracted position, FIG. 1.

Figure 3:
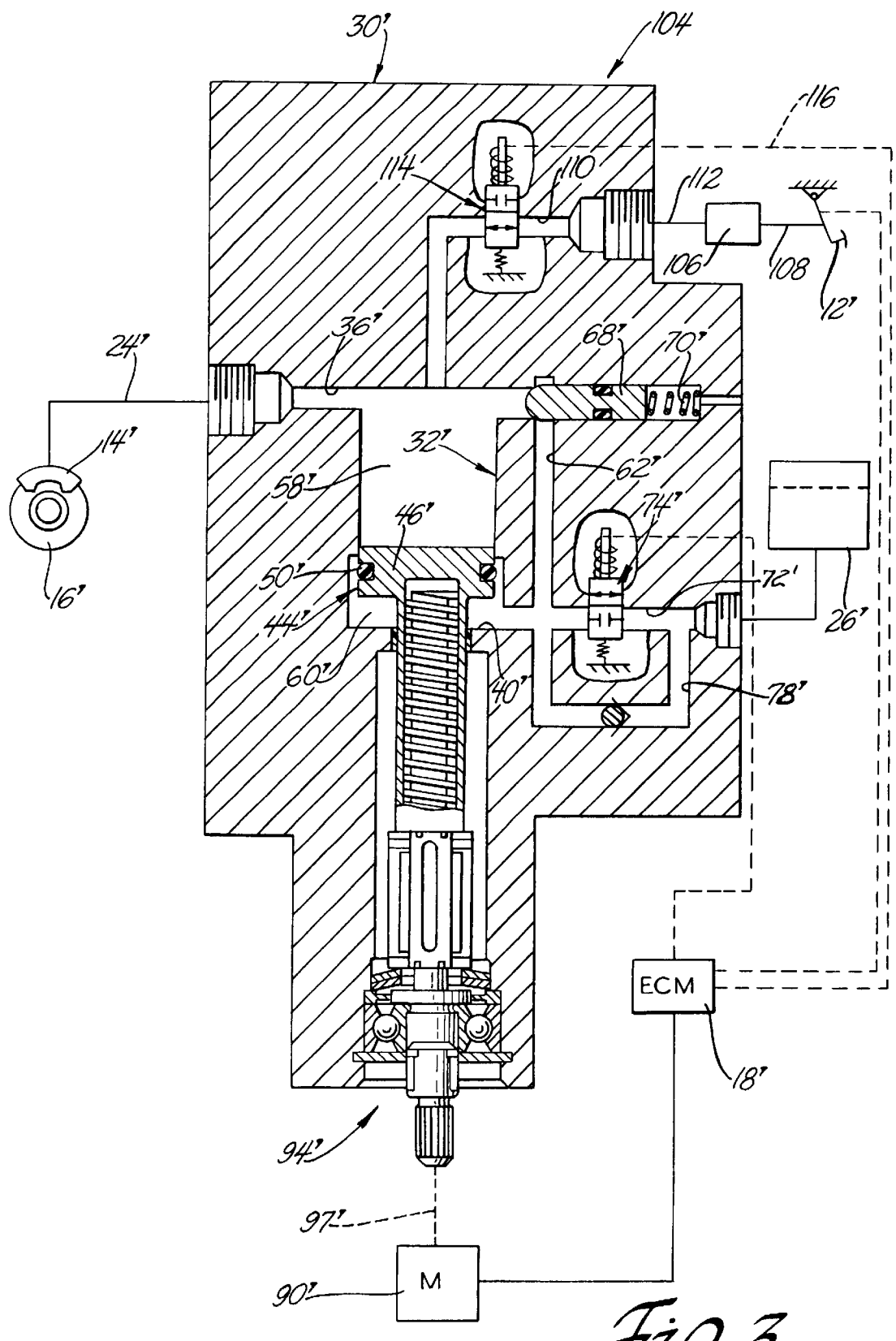
FIG. 3 is a schematic, partially broken-away view of a motor vehicle brake-by-wire brake system including a modified electro-hydraulic actuator according to this invention.

Referring to FIG. 3, a modified electro-hydraulic actuator 104 according to this invention is structurally the same as the electro-hydraulic actuator 22 except for the absence from the modified electro-hydraulic actuator of structure corresponding to the compensation valve element 84, the valve seat 82, the valve spring 86, and the passage 88 in the electro-hydraulic actuator 22 and in the addition of a brake master cylinder 106 and other structural elements described below. Structural elements of the modified electro-hydraulic actuator 104 common to the electro-hydraulic actuator 22 are identified in FIG. 3 with primed reference characters.

The brake master cylinder 106 may have the structure described in either of U.S. Pat. Nos. 5,729,979 and 5,603,217, issued Mar. 24, 1998 and Feb. 18, 1997, respectively, and assigned to the assignee of the this invention, the disclosures of which are incorporated herein by reference. The brake master cylinder generally includes a piston assembly, not shown, which is normally immobilized and a compliant member, not shown, between the piston assembly and a link 108 connected to the brake pedal 12'. The compliant member accommodates limited pedal travel of the brake pedal 12' without corresponding linear translation of the piston assembly.

The brake master cylinder communicates with the primary chamber 58' in the housing 30' through a passage 110 in the housing and an external fluid conduit 112. A solenoid operated isolator valve 114 in the passage 110 is electronically controlled by the ECM 18' through a schematically represented conductor 116. When the solenoid is off, FIG. 3, the isolator valve is open and the passage 110 is unblocked. When the solenoid is on, the isolator valve is closed and the passage 110 is blocked. Also, contrary to its operation in the electro-hydraulic actuator 22, the solenoid operated exhaust valve 74' in the modified electro-hydraulic actuator 104 is closed, FIG. 3, when its solenoid is off and open when its solenoid is on.

In the absence of an apply force on the brake pedal 12', the piston 44' assumes its retracted position, FIG. 3, the solenoid operated exhaust valve 74' is closed, and the solenoid operated isolator valve 114 is open. The primary and secondary fluid chambers 58',60' communicate with each other across the seal 50' on the piston head 46' and with a second fluid reservoir at atmospheric pressure, not shown, in the master cylinder 106 so that the wheel brake 14', the hydraulic channel 24', and the primary and secondary chambers 58',60' are all filled with fluid at atmospheric pressure and the rotor 16' is released from the wheel brake. The reservoirs communicate fluid from one to the other as needed.

When a pedal force is applied to the brake pedal 12', the ECM turns on the solenoid operated isolator valve 114 to close the passage 110 and turns on the electric motor 90' to initiate linear translation of the piston 44' through the speed reducer 94' toward the top end 36' of the piston bore 32' and apply the wheel brake to the rotor as described above. To release the wheel brake, the pedal force on the brake pedal 12' is released. The ECM 18' turns on the electric motor 90' in the opposite direction to backdrive the piston 44' toward its retracted position until the fluid pressure decreases to the transition pressure and the spring 70' thrusts the transition valve element 68' to its closed position. Then, the ECM 18' turns on the solenoid operated exhaust valve 74' to open the exhaust passage 72' and turns off the solenoid operated isolator valve 114 to open the passage 110. The secondary chamber exhausts to the reservoir 26' through the exhaust passage 72' and the expanding primary chamber 58' is replenished with fluid from the master cylinder reservoir through the passage 110 as the electric motor backdrives the piston to its retracted position.

For energy conservation and maximum durability, the ECM turns off the electric motor 90' when the pedal force is sustained for a predetermined duration after the motor vehicle is stopped. In that circumstance, a net pressure force on the piston head 46' backdrives the piston 44' toward the bottom end 40' of the piston bore 32' and the electric motor 90' through the speed reducer 94' until the fluid pressure in the primary chamber is reduced to the transition pressure. Then, the transition valve element 68' is thrust by the spring 70' to its closed position blocking the bypass passage 62' and creating a fluid lock which immobilizes the piston in the piston bore. The fluid pressure then prevailing in the wheel brake is slightly below the transition pressure but still of sufficient magnitude that the wheel brake 14' prevents rotation of the rotor 16'. When the pedal force is released, the ECM turns on the electric motor in the brake release direction of rotation of its output shaft and also the solenoid operated exhaust valve 74' while turning off the solenoid operated isolator valve 114 to permit the electric motor to backdrive the piston 44' to its retracted position.

In the event that the modified electro-hydraulic actuator 104 is unable to deliver fluid at high pressure to apply the wheel brake 14', the operator of the motor vehicle increases the pedal force until the limited pedal travel relative to the master cylinder piston assembly afforded by the compliant member is exceeded. Then, the master cylinder piston assembly is translated linearly by the link 108 connected to the brake pedal to pump fluid into the primary chamber 58' through the passage 110 and the open solenoid operated isolator valve 114 to increase the fluid pressure in the hydraulic channel 24' and in the wheel brake 14' to squeeze the wheel brake against the rotor 16'.

What is claimed is:

1. An electro-hydraulic actuator for a motor vehicle brake-by-wire brake system including a fluid pressure operated wheel brake comprising:

a housing including a piston bore having a top end and a bottom end, a T-shaped piston including a disc-shaped piston head having top side and a bottom side and a tubular stem perpendicular to the bottom side of the disc-shaped head, a mounting means operative to support the disc-shaped piston head in the piston bore for linear translation with the tubular stem concurrently guided in and out of the bottom end of the piston bore so that the disc-shaped piston head divides the piston bore into a cylindrical primary chamber between the top end of the piston bore and the top side of the disc-shaped piston head and an annular secondary chamber between the bottom end of the piston bore and the bottom side of the disc-shaped piston, a first fluid passage means operative to connect the wheel brake to the primary chamber, a drive means operative to effect linear translation of the piston toward the top end of the piston bore to increase fluid pressure in the primary chamber and in the wheel brake, a second fluid passage means connecting the primary and secondary chambers;

means for sensing fluid pressure in the primary chamber; and a valve in the second fluid passage opening the second fluid passage when the sensed fluid pressure in the primary chamber exceeds a transition fluid pressure in the primary chamber to expose the secondary chamber to the fluid pressure in the primary chamber and otherwise closing the second fluid passage, so that in a low pressure interval of operation of the electro-hydraulic actuator below the transition pressure the effective area of the piston is the area of the top side of the disc-shaped piston head and in an ensuing high pressure interval of operation of the electro-hydraulic actuator above the transition pressure the effective area of the piston is the area of the cross-sectional profile of the stem of the piston.

2. The electro-hydraulic actuator for a motor vehicle brake-by-wire brake system recited in claim 1 wherein the drive means comprises:

a valve seat means operative to define a valve seat around the second fluid passage, transition valve element exposed to the primary chamber and supported on the housing for bodily movement from a closed position engaging the valve seat and blocking the second fluid passage to an open position remote from the valve seat and unblocking the second fluid passage in response to fluid in the primary chamber the transition pressure, and wherein the means for sensing fluid pressure comprises, together with the transition valve element, a spring biasing the transition valve element toward the closed position thereof.

3. The electro-hydraulic actuator for a motor vehicle brake-by-wire brake system recited in claim 2 wherein the drive means comprises:

an electric motor, and a speed reducer means operative to convert output torque of the electric motor into linear thrust on the piston toward the top end of the piston bore.

4. The electro-hydraulic actuator for a motor vehicle brake-by-wire brake system recited in claim 3 wherein the speed reducer means comprises:

a drive shaft rotatably supported on the housing and connected to an output shaft of the electric motor for rotation as a unit therewith having a screw-threaded end overlapping the piston in the tubular stem thereof, and a nut means on the tubular stem of the piston cooperating with the screw-threaded end of the drive shaft in converting rotation of the drive shaft into linear thrust on the piston.

5. The electro-hydraulic actuator for a motor vehicle brake-by-wire brake system recited in claim 4 further comprising:

a brake master cylinder means connected to the primary chamber through a master cylinder passage means in the housing operative in response to a pedal force on a brake pedal of the motor vehicle connected to the brake master cylinder to pump fluid from the brake master cylinder into the primary chamber, and an electronic solenoid operated isolator valve operative when the electronic solenoid thereof is turned off to unblock the master cylinder passage means and when the electronic solenoid thereof is turned on to block the master cylinder passage means.

* * * * *